UNITED STATES PATENT OFFICE.

SAMUEL WILFORD RAMSEY AND GUY WARREN SMITH, OF YOUNGSTOWN, OHIO, ASSIGNORS TO THE RAMSEY-SMITH COMPANY, OF YOUNGSTOWN, OHIO, A CORPORATION OF OHIO.

COMPOSITION FOR SOLIDIFYING FLUE-DUST.

No. 900,587.     Specification of Letters Patent.     Patented Oct. 6, 1908.

Application filed January 9, 1908. Serial No. 410,003.

*To all whom it may concern:*

Be it known that we, SAMUEL W. RAMSEY and GUY W. SMITH, citizens of the United States, and residents of Youngstown, in the county of Mahoning and State of Ohio, have made certain new and useful Improvements in Composition for Solidifying Flue-Dust, of which the following is a specification.

In the operation of blast furnaces, for the reduction of iron from its ores, there accumulates in the dust chamber at the bottom of the down-take pipe from the furnace, a considerable quantity of dust, which consists of small particles of oxid of iron, coke and other constituents of the furnace charge, which dust by the force of the blast is carried out of the furnace and is from time to time discharged from the dust chamber by a valve. This flue dust contains from 50 to 60 per cent. of iron.

Our invention consists in a composition of matter for the conversion of this flue dust, or any other fine iron ore, into bricks or solid masses which may be treated as lump iron ore for the reduction of the iron contained therein, without being blown out of the furnace by the blast.

In carrying out our invention, we take for one hundred pounds of flue dust, a binder compounded as follows—

Lime _____ 10 pounds
   Slag cement _____ 9 "
   Prince's metallic _____ 1 "

These solid constituents after being finely ground are thoroughly and uniformly mixed with 100 pounds of the flue dust, and a quantity of water sufficient to make a stiff mortar is then added. The whole is then worked up together into a plastic mass which is molded, pressed, or otherwise divided into lumps, blocks, bricks, or other forms, and allowed to dry and harden.

As a means for securing a thorough intermixture of the "Prince's metallic" we sometimes mix the flue dust, the lime and cement together first, and then add the "Prince's metallic" to the water and stir it into a condition of complete suspension and solution and then add this liquid to the other ingredients. When, however, the composition is to be fully prepared for use or sale as a binder before admixture with the flue dust, the lime, cement and "Prince's metallic" are mixed together and are added when wanted to the flue dust and the water afterwards added. The lumps, bricks, or blocks, after being dried are then ready to be charged into a furnace like lump iron ore for the reduction and utilization of the iron which they contain.

In order that the exact nature of the ingredients which we use may be understood, we would state that the slag cement which we use contains about 50 per cent. of lime, 31 per cent. of silica, 12 per cent. of alumina and iron, and 1 to 2 per cent. of sulfur and magnesia. As to the "Prince's metallic", the grade of this which we employ is No. 2, containing sesquioxid of iron 48 per cent., calcium sulfate 47 per cent., and small quantities of silica and silicate.

In defining our invention with greater clearness we would state that we are aware that efforts have heretofore been made to consolidate the flue dust of iron furnaces. For which purposes clay and liquid glue has been used, but the readily combustible organic character of the glue allows it to quickly burn out and the briquet to disintegrate into powder and be blown out by the blast. We are also aware that lime has been used in such efforts and that various salts and acids have been used. These for the most parts have a corrosive and objectionable action on the furnace. In our invention the slag cement forms a very desirable binder, but even this when calcined allows more or less disintegration by the driving off of the water of crystallization, but when the "Prince's metallic" (sesquioxid of iron and calcium sulfate) is also incorporated we find that it maintains the solidity and integrity of the lumps or bricks under a high heat until a proper reduction of the iron is secured.

We claim—

1. A composition for solidifying flue dust and fine iron ore, consisting of lime, hydraulic cement and sesquioxid of iron in or about the proportions named.

2. A composition for solidifying flue dust and fine iron ore, said composition containing lime, hydraulic cement, sesquioxid of iron and calcium sulfate, in or about the proportions named.

3. A composition for solidifying flue dust and fine iron ore, said composition containing lime, slag cement and "Prince's metallic" in or about the proportions named.

4. As a new article of manufacture, a conglomerate brick, composed of flue dust, lime, hydraulic cement and sesquioxid of iron in or about the proportions named incorporated together and solidified by means of water and then dried.

SAMUEL WILFORD RAMSEY.
GUY WARREN SMITH.

Witnesses:
EDW. W. BYRN,
SOLON C. KEMON.